United States Patent Office 3,787,515
Patented Jan. 22, 1974

3,787,515
ISOPRENE POLYMERIZATION INHIBITOR
Boris Nikolaevich Gorbunov, ulitsa Lenina 5, kv. 41, Volgograd, U.S.S.R.; Anatoly Ivanovich Lukashov, prospekt Lenina 32, kv. 20, Volzhsky, U.S.S.R.; and Tamara Ivanovna Mukhortova, ulitsa Borovskogo 2; and Alexandr Pavlovich Khardin, ulitsa Mira 26, kv. 101, both of Volgograd, U.S.S.R.
No Drawing. Filed May 19, 1971, Ser. No. 145,037
Int. Cl. C07c 7/00, 7/18
U.S. Cl. 260—681.5     3 Claims

ABSTRACT OF THE DISCLOSURE

An isoprene polymerization inhibitor, characterized in that it is o-nitrophenol and is effective in preventing polymer clogging in the column during purification of isoprene by rectification.

---

The present invention relates to isoprene technology, and more particularly to isoprene polymerization inhibitors.

Isoprene polymerization inhibitors now in use in industry, such as the wood tar inhibitor (which is a product of dry distillation of oak and beech wood, containing about 80% of catechol) and the American "Inhibitor 4010 A" do not preclude polymerization of the monomer during rectification. In the presence of these inhibitors rectifying columns are clogged with the polymer. Therefore rectifying columns must be periodically shut down, freed from isoprene, steamed, dismantled and subjected to mechanical cleaning to remove the polymer. All these operations result in considerable losses of isoprene and impair the productivity of the process equipment.

The object of the present invention is to provide a highly effective isoprene polymerization inhibitor which would preclude clogging of the process equipment with the polymer when the monomer is purified from admixtures by rectification techniques.

Said object is accomplished by introducing into isoprene a novel inhibitor at a different stage of the purification process, this novel inhibitor being o-nitrophenol. o-nitrophenol is noted for its good solubility in isoprene, which ensures uniform distribution thereof within the entire mass of the monomer, and features high inhibiting activity. Moreover, o-nitrophenol regulates the process of isoprene polymerization. Its presence promotes the formation of low-molecular weight polyisoprenes, readily soluble in the monomer. This circumstance is especially important, since even in case of formation of the polymer the latter will not accumulate in the columns, but is removed therefrom in the form of a solution together with the still bottoms.

The required amount of the inhibitor to be introduced is determined by the character of admixtures present in isoprene and by the conditions of its processing. Thus, in case dimethyl formamide, cyclohexanone or cyclopentadiene is present in the mixture, the amount of o-nitrophenol should be greater than if no such admixtures are present in isoprene.

For the processes of rectification of isoprene produced by dehydration of isopentane and decomposition of 4,4-dimethyldioxane-1,3, the concentration of the inhibitor equal to 0.01–1.0 weight percent of the isoprene proves to be adequately effective.

The inhibitor is introduced into the rectification system as a solution in isoprene (the concentration of the solution depending on the temperature conditions of preparing the solution). The solution is batched directly into the reflux supplied into the column. The inhibitor is fed into all those columns where the separation of isoprene fractions or final purification of isoprene by rectification are to take place.

O-nitrophenol, as an isoprene polymerization inhibitor in the course of isoprene purification and isolation by rectification, is superior to the known wood tar inhibitor and "Inhibitor 4010 A." While in the presence of the above-mentioned known inhibitors the run of the rectifying columns, when isolating and purifying isoprene, is 4–5 and 8–10 months respectively, with the use of o-nitrophenol completely eliminates clogging of the rectifying columns with the polymer. This can be explained by the fact that in the presence of o-nitrophenol there form low-molecular weight polymers which are readily soluble in isoprene and concomitant admixtures. The polymer does not accumulate in the column, as is the case when other inhibitors are used, but is removed together with the still bottoms.

Given hereinbelow are some examples by way of illustration.

EXAMPLE 1

A 100 ml. glass tube was charged with 50 ml. of isoprene and a required amount of o-nitrophenol was introduced thereinto. The tube was evacuated, filled with nitrogen and sealed. Several glass tubes thus filled were placed on an oil bath and kept at 110° C. over a required period of time. At intervals, the tubes were opened and the content of monomeric isoprene in the reaction mass was determined. The results were compared with the data obtained with the use of other inhibitors. In the table presented hereinbelow comparative data are given for the inhibiting effectiveness of o-nitrophenol and wood tar inhibitor, as obtained with the optimum amount of the inhibitors.

|  | Content of isoprene, percent | |
|---|---|---|
|  | Wood tar inhibitor | o-Nitrophenol |
| 1 | 2 | 3 |
| Time, hours: |  |  |
| 12 | 67.4 | 90.0 |
| 20 | 64.2 | 75.0 |
| 30 | 50.1 | 70.9 |
| 44 | 45.9 | 67.3 |
| 56 | 37.6 | 54.0 |
| 64 | 34.3 | 44.3 |
| 78 | 12.1 | 40.3 |
| 280 | Polymer | 10.5 |
| 400 | Polymer | 2.0 |
| 600 | Polymer | 1.0 |

It should be pointed out that in the presence of o-nitrophenol in all the cases after prolonged heating a mass is formed with a viscosity similar to that of an isoprene dimer, whereas with the use of the wood tar inuibot isoprene polymerizes after 280 hours with the formation of a rubber-like product.

EXAMPLE 2

A rectifying column is fed with an isobutylene-isoprene fraction at a rate of 6–7 t./hr. The temperature of the column top is 25–26° C., the temperature of the still is about 65° C. To preclude polymerization of isoprene, 0.2% of o-nitrophenol is introduced into the fraction. During rectification isobutylene is separated to the content of 0.1% in the still. No clogging of the column with the isoprene polymer is observed.

EXAMPLE 3

A rectifying column is fed with crude isoprene containing about 99.5% of isoprene, 0.02% of isobutylene, 0.02% of isoamylene, 0.07% of methanol, 0.13% of trimethyl carbinol and carbonyl compounds. The rate of feed is 5–7 t./hr. The temperature of the column top is 52° C., the temperature of the still is 60° C. To prevent polymerization of isoprene in the process of rectification a solution of o-nitrophenol in purified isoprene is introduced into the reflux. The quantity of the solution depends on its concentration and is rated to be 0.2% for the total mass of the isoprene fed for rectification. No clogging of the column with the products of isoprene polymerization takes place, since the resulting oligomer is dissolved in the still liquor and is removed together therewith from the still of the column.

What is claimed is:

1. In the process for purifying essentially solvent-free liquid isoprene by rectification in a packed column, the improvement which comprises adding a polymerization inhibitor consisting essentially of o-nitrophenol to the liquid isoprene being rectified.

2. The improvement according to claim 1 wherein o-nitrophenol dissolved in purified isoprene is added to the reflux supplied into the column.

3. The improvement according to claim 1 wherein the o-nitrophenol is added in the amount of 0.01 to 1.0 weight percent based on the weight of the isoprene.

References Cited

UNITED STATES PATENTS

| | | | |
|---|---|---|---|
| 3,510,405 | 5/1970 | Takao et al. | 203—9 |
| 3,405,189 | 10/1969 | Sakuragi et al. | 260—666.5 |
| 3,436,436 | 4/1969 | Takao et al. | 260—681.5 R |

FOREIGN PATENTS

| | | | |
|---|---|---|---|
| 1,146,195 | 3/1969 | Great Britain | 260—666.5 |
| 1,198,890 | 7/1970 | Great Britain | 260—666.5 |

DELBERT E. GANTZ, Primary Examiner

J. M. NELSON, Assistant Examiner

U.S. Cl. X.R.

260—666.5; 203—9